United States Patent [19]

Haberl et al.

[11] 4,266,263

[45] May 5, 1981

[54] FORCE MEASURING CAPACITOR

[75] Inventors: Rainer Haberl, Traiskirchen; Josef Kastner, Vienna, both of Austria

[73] Assignee: Semperit Aktiengesellschaft, Vienna, Austria

[21] Appl. No.: 870,476

[22] Filed: Jan. 18, 1978

[30] Foreign Application Priority Data

Jan. 21, 1977 [CH] Switzerland .................... 730/77

[51] Int. Cl.³ ............................................. H01G 7/00
[52] U.S. Cl. .................................... 361/283; 361/278; 361/279; 177/210 C
[58] Field of Search ............ 361/283, 311, 323, 278, 361/279; 177/210 C

[56] References Cited

U.S. PATENT DOCUMENTS

| 151,004 | 5/1874 | Browne | 361/311 |
|---|---|---|---|
| 2,080,429 | 5/1937 | McNally | 361/283 |
| 2,627,645 | 2/1953 | Harris | 361/311 X |
| 2,755,796 | 7/1956 | Boucke | 361/283 X |
| 3,177,967 | 4/1965 | Wilson | 361/283 |
| 3,187,071 | 6/1965 | Radziejowski | 174/102 SC |
| 3,260,883 | 7/1966 | Martin | 361/323 |
| 3,270,122 | 8/1966 | Binek | 174/117 A |
| 3,405,559 | 10/1968 | Moffatt | 361/283 |
| 3,875,481 | 4/1975 | Miller et al. | 361/283 |
| 3,993,939 | 11/1976 | Slavin | 361/283 |
| 4,102,422 | 7/1978 | Christiansson | 361/283 |

Primary Examiner—E. A. Goldberg
Attorney, Agent, or Firm—Werner W. Kleeman

[57] ABSTRACT

A capacitor comprising at least two electrodes separated from one another by an elastic dielectric formed of rubber and/or plastic for measuring forces acting upon one of the electrodes—the so-called measuring electrodes—by detecting the resultant change in capacitance. The dielectric in its unloaded state is pre-compressed and preferably possesses a number of hollow spaces.

24 Claims, 18 Drawing Figures

FORCE MEASURING CAPACITOR

BACKGROUND OF THE INVENTION

The present invention relates to a new and improved capacitor having at least two electrodes separated from one another by an elastic dielectric formed of rubber and/or plastic for measuring forced acting upon the one electrode—the so-called measuring electrode—by detecting the resultant change in capacitance. The invention also concerns a method of measuring forces by means of such capacitor.

Especially in the case of large surface capacitor units there exists a basic problem which arises during the deformation of the elastic dielectric in terms of the limited transverse elongation possibility of rubber bodies which are clamped at a pressure surface and oppositely situated base surface. The forces acting upon the pressure surface are divided into two components, namely into a first component extending in the direction of deformation and a second component perpendicular thereto, in other words extending in a direction parallel to the electrodes. The force which extends in the direction of the electrodes causes transverse elongation of the elastic dielectric and, thus, affects the magnitude of the deformation region and thus the measuring region or range.

In German Pat. No. 1,916,496 of National Research Development Corporation there is taught to the art a capacitor wherein through the provision of hollow spaces or voids arranged in the electrodes, there is achieved a more favorable transverse elongation capability of the dielectric. Since in this case the hollow spaces in the electrodes serve for receiving the deformed material of the dielectric, the volume of such hollow spaces must be at least equal in size to the deformation arising during maximum loading of the capacitor, i.e. either the diameter of the hollow spaces must be very large with smaller thickness of the electrodes or else the electrode thickness must be large when the hole diameter is small. In the first-mentioned instance there, however, arises a weakening of the electrode plates as concerns the strength thereof, and in the last-mentioned case there is present too great rigidity which is unfavorable for an exact measurement result. Additionally, the force flow in the dielectric is extremely unfavorable, since the transverse elongation force effective in the electrode direction and derived from the force acting upon the capacitor must be further deflected at the region of the hollow spaces, and which force then extends in a direction opposite to the force which is to be measured.

This drawback can be somewhat alleviated by providing a nap-shape configuration of one of both electrode contact surfaces of the dielectric, as taught for instance in German Pat. No. 2,448,398 of Uniroyal Inc. Yet, when improving the flow of the forces in the dielectric there arise however drawbacks in the stability of the dielectric in relation to shear forces acting upon the electrodes, i.e., each force which does not act exactly perpendicular to the electrode can only be inaccurately measured due to the losses converted into shear forces.

A particular problem especially as concerns the measurement of dynamic forces resides in the non-linearity of the pressure or compression deformation characterisitic of a rubber elastic or elastomeric dielectric at the starting region. Here the last part of the recovery occurs over a relatively long period of time, so that the accuracy in the measurement of short successively following forces decreases with increasing frequency. Force pulses of approximately the same magnitude and following one another rapidly in succession are only capable of being determined in the form of a uniform capacitance change brought about by a static load.

SUMMARY OF THE INVENTION

Hence, with the foregoing in mind it is a primary object of the present invention to provide a new and improved capacitor and a method for measuring forces by the use thereof, in a manner not associated with the aforementioned drawbacks and limitations of the prior art proposals.

Another and more specific object of the present invention aims at constructing a capacitor of the previously mentioned type for measuring forces while eliminating all of the above-discussed drawbacks concerning the transverse elongation capability.

Still a further significant object of the present invention aims at a new and improved construction of a capacitor of the previously mentioned type for measuring forces, while providing an approximate linearity of the compression strain or deformation characteristic dependent upon the behavior of the pressure applied at the capacitor for deformation in order to optimize the measuring accuracy not only with regard to the determination of the maximum value of the effective pressure or compression, but rather in particular for the exact determination of the entire course of the force as a function of time as well as a particular dynamic behavior of the capacitor wherein it is possible to even more clearly distinguish from one another forces acting upon the measuring electrode in succession during a time duration of milliseconds.

Now in order to implement these and still further objects of the invention, which will become more readily apparent as the description proceeds, the invention contemplates that the dielectric, in its unloaded state, is pre-compressed and preferably possesses a number of hollow spaced or voids.

Due to the pre-compression of the dielectric the non-linear part of the compression strain characteristic—also referred to as the compression strain characteristic curve or line—is eliminated for the most part, so that the dynamic behavior of the capacitor is appreciably increased and there is suppressed every possibility of there arising oscillations which could influence the accuracy of the measurement result.

The hollow spaces also render possible for there to occur at the center of the dielectric a transverse elongation equal to the marginal zones by virtue of the deformation, so that there is obtained over the entire region of the dielectric a uniform deformation resistance, and thus, reproducible results throughout the entire measuring surface region.

The greater transverse elongation capability also results in an increased compressibility of the dielectric, so that there can be enlarged the measuring range and thus the sensitivity.

Due to the negative pressure in the hollow spaces there is obtained a pre-compression of the dielectric in its unloaded state by virtue of the greater external pressure, so that the start of the measuring range or region—the so-called null point—is shifted out of the relatively non-linear starting region extending up to 0.5 deca-Newtons cm² into a linear region.

Additionally, by virtue of the negative pressure it is however also possible to positively influence the remaining region of the deformation or strain characteristic line inasmuch as the resistance which becomes increasingly greater as deformation proceeds and which is caused by the compression of the gas in the hollow spaces, is eliminated.

An advantageous range of the negative pressure in the hollow spaces is below about 0.8 bar, and with increasing negative pressure the starting region of the compression deformation or strain characteristic which is eliminated by shifting the null point becomes increasingly greater, and the dynamic behavior is optimized. If the material of the dielectric located between the hollow spaces is connected with the electrode surface confronting the hollow spaces by means of an adhesive devoid of easily volatile constituents, then there is also ensured for greater longevity since the hollow space-negative pressure remains constant and is not reduced due to vaporization of low boiling constituents. The adhesive bond of the electrodes is especially of significance as concerns reduction of the hysteresis since such is the primary cause of the pronounced parabolic-like force profile—viewed in the cross-section of the dielectric—and at the region of the adhesive bond the shear forces are approximately null and continuously increase towards the center. The maximum shear force at the center, immediately after removal of the deformation load, acts as a spring which is effective in the reverse direction, so that during the recovery there is only effective intermolecular friction. There is eliminated by virtue of the bond or connection all friction between the electrode and the material of the dielectric located between the hollow spaces which would otherwise increase the hysteresis.

Due to an optimum connection of the material of the dielectric located between the hollow spaces or voids with the electrode there can be utilized the high elasticity of the steel electrode inasmuch as the electrode which is deformed in the elastic range entrains, by means of the so-called membrane effect, the deformed dielectric material during the deformation recovery owing to the appreciably shorter recovery time, so that the hysteresis can be appreciably reduced.

A foil which is adhesive at both faces can be particularly advantageously employed both with respect to the requisite uniformity of the adhesive layer as well as also as concerns accomplishment of the adhesive bond.

According to a further advantageous possibility of achieving the bond or connection when using rubber as the material of the dielectric located between the hollow spaces, there is also contemplated achieving the connection with the electrodes by vulcanization, whereby there is completely eliminated the problem of a uniform adhesive layer. Additionally, there is realized a clear linearization of the deformation or strain characteristic line at the region of the maximum load, and when using an adhesive there results a curvature due to the flow thereof.

An advantageous feature of the invention which combines the advantages obtained by the hollow space-negative pressure additionally with the advantage of overcoming the excess pressure effective at the upper electrode, is realized in that both electrodes are interconnected by strands formed of electrically insulating material. These strands are subjected to a tensile load or stress and are arranged in the hollow spaces and extend in a direction perpendicular to the electrodes. These strands should possess an extremely low elasticity and a high flexibility, as is afforded for instance by glass cords or polyamide fibers.

In this manner there can be realized, similar to the use of a hollow space-negative pressure a pre-compression of the dielectric in its unloaded state in that the length of the stretched strands arranged between the electrodes is shorter by the amount of the desired pre-compression than the thickness of the elastic dielectric in its unloaded state. The advantage of this resides in the fact that in the case of the negative pressure prevailing in the hollow spaces there is eliminated the excess pressure effective at the upper electrode and preventing the deformation recovery, so that it is possible to reduce the hysteresis to a negligible minimum of a few percent. By appropriately increasing the bending strength of the strands it is additionally possible to augment the recovery by means of their spring action in the bent state, and the deformation of the dielectric and being of the strands is increased by an appropriate value.

What is especially important for the degree of the deformation of the dielectric and therefore also for obtaining an exact measurement result is the relationship of the surface of the dielectric which is in contact with the electrodes to the outer or jacket surface of the hollow spaces. This ratio or relationship, designated as the form factor, especially when utilizing the invention in the field of biomechanics where the deformation of the dielectric is small, should amount to between about 0.2 to about 0.7, preferably between about 0.3 to about 0.5. A form factor exceeding 0.7 means that the deformation path and thus the measuring range are very small, so that there is also impaired the accuracy of the measurement result. Additionally, it is extremely difficult to realize a linearity of the deformation or strain characteristic lines.

While falling below the lower boundary of about 0.3 would indeed result in a further increase of the measuring range, nonetheless the ratio or relationship of the web height to the web width of the webs located between the hollow spaces would be unfavorable to such an extent that during deformation there would be produced kinks and thus irregularities in the compression strain characteristic curve or line. It is therefore advantageous if the small web width between two hollow spaces is approximately equal to the web height.

A further advantageous feature of the invention resides in reduction of the transverse elongation forces arising during deformation in the dielectric and resides in the feature that the material of the dielectric located between the hollow spaces is of cellular structure. As a result, in addition to the hollow spaces it is also possible to compress the preferably open cells, so that with constant form factor it is possible to appreciably increase the deformation path.

By providing a convex doming or arching of the cylindrical jacket surface of the hollow spaces, it is possible to reduce the shear and tension stresses which particularly arise at the direct deformation region of the jacket surface, so that it is possible to impart linearity to the compression strain characteristic line especially at its end or terminal region.

A recoil elasticity of the material of the dielectric located between the hollow spaces exceeding about 70%, preferably beyond about 80% (measured according to DIN (German Industrial Standard) 53.512 of July 1976) is indispensable, especially in order to minimize the hysteresis. Equally of advantage is a compression deformation remnant—measured according to DIN 53.517 of January 1972—of less than about 5%, preferably less than about 3%, to ensure for a low fatigue of the dielectric.

The optimization of the measuring accuracy which can be realized due to the special configuration of forming of the dielectric can be unfavorably affected by using an unsuitable electrode material. It is for this reason that particularly in the presence of relatively low pressures, the measuring electrode to which there is applied the force to be measured should be formed of high elastic steel having an elastic limit exceeding about 900 Newton per mm$^2$ and a thickness of about 0.1 to about 0.8 mm. Consequently, it is possible to nonetheless eliminate any permanent deformation owing to the high elastic limit with lesser electrode thickness which increase the flexibility and additionally shortens the recovery time owing to the reduced mass. The extremely short recovery time of high elastic steel additionally has the beneficial result of reducing the hysteresis due to the previously mentioned membrane effect.

By providing a grid-shaped construction of the electrodes, it is possible to appreciably reduce their contact or support surface, so that changing the spacing of the electrodes with respect to one another produces a lower resistance of the material of the dielectric located between the hollow spaces. In other words: the sensitivity is appreciably increased.

It is especially advantageous to provide a wave-shaped construction of the capacitor—viewed in cross-section—for the bending of the inventive capacitor for measuring forces impinging upon a curved plane.

In order to reduce the spacing of both electrodes relative to one another, such can possess profiled or structured portions which protrude into the dielectric. As a result, it is possible to use thicker dielectrics for increasing the measuring range, without having to accept a disadvantageous minimum capacitance change.

If desired, the electrodes can be formed of electrically conductive rubber or plastic, so that both the electrodes as well as also the dielectric are practically identical as concerns their chemical and especially mechanical properties, and furthermore, it is possible to form surfaces of higher order without difficulties. The connection of the electrode and the dielectric is homogeneous and is accomplished without having to resort to the aid of an adhesive, so that it is therefore possible to eliminate the problem of the flow of the adhesive, especially at maximum load.

According to a further advantageous construction of the invention for optimizing the compression deformation and the therewith corresponding capacitance change, it is possible to construct at least one of the electrodes so as to possess holes at the region of the material located between the hollow spaces. These holes provide a further elongation capability for the deformed material of the dielectric.

It is possible to electrically screen the capacitor from disturbing effects while avoiding unfavorably influencing the linearity of the compression strain or deformation characteristic lines which are obtained by the use of hollow spaces, negative pressure and the like, by electrically connecting a metal foil enclosing the reference electrode with the measuring electrode.

An advantageous construction of capacitor for measuring and locating pressures of a relatively large measuring surface which are effective at a relatively small surface resides in subdividing at least one electrode into a number of mutually independent electrode plates. The course of the force can be exactly localized by mutually separately detecting the capacitance change of the individual capacitors at a co-ordinate system. If both electrodes consist of individual partial electrodes, then it is also possible in accordance with the degree of the mutual displacement in the direction of the electrode, to measure shear forces.

When using hollow spaces it is advantageous if such are mutually separated from one another in an airtight fashion, whereby the gas located at the region of the deformed location of the measuring electrode in the hollow spaces is not displaced into the remaining hollow spaces and at that location enlarges the electrode spacing due to the pressure build-up and thus falsifies the measurement result.

Techniques for measuring forces randomly occurring as a function of time as well as locally randomly occurring within a predetermined surface have been employed, in among other fields, for measuring axle loads i.e., the vehicle frequency upon roads or the like, the affect of the force of a movement or the like. While in the first-mentioned field of use there is only of interest the maximum value of the deformation, corresponding to the weight of the vehicle and the axle pressure, with the frequency measurement there is only counted a pulse caused by loading of the capacitor. With all measuring techniques of the aforementioned type it is necessary immediately after disappearance of the effective force component to again assume the starting position—the so-called null point position—in order to be able to measure further force components directly following the first force component and which are smaller in magnitude. It is for this reason that heretofore known force measuring devices, wherein an absolutely rigid measuring plate is mounted at its corners upon quartz crystals in the form of a rigid bridge construction and the forces of which acting upon the measuring plate are measured by means of the piezoelectric effect, must have their measuring surface dimensioned to be relatively small. Further, on the one hand, the mass inertia of the measuring plate which impairs the dynamics of the measuring operations is still insignificant when performing the previously mentioned determination of maximum values with a measuring error of a few percent which is acceptable for this purpose, and, on the other hand, the oscillations which occur after relieving the measuring plate of load are still controllable and do not have any particular effect upon the measurement result.

The consequences resulting from the small dimensioning of the measuring surface, particularly in the field of athletics, biomechanics, orthopaedics, ergonomics, and so forth, resides in the predetermined spatial limitation of the course of the movement to be checked and the thus resultant deviations from the natural movement course.

It is an important object of the method of the invention for measuring forces randomly occurring with respect to time as well as locally within a predetermined surface, to especially be able to measure movement courses without any limitations as concerns time and spatially with regard to the measuring technique and to obtain a high measuring sensitivity as well as a large measuring range for the exact determination of the force components acting upon the capacitor as well as to obtain a particularly dynamic measuring method.

Now in order to implement this objective, the invention contemplates having the forces effective at a measuring electrode of the capacitor, which measuring electrode corresponds to the predetermined surface. The capacitor contains a rubber elastic or elastomeric dielectric, and furthermore, there is plotted the course as a function of time of the capacitance changes of the capacitor which correspond to the effect of the force.

By utilizing an elastomeric dielectric there is provided for the measuring plate—the measuring electrode—a contact or support surface which is uniform over the entire measuring surface, so that without consideration of a high rigidity or stiffness of the measuring electrode such can be constructed in cross-section to be smaller and with the same mass correspondingly greater in surface.

Due to the exact plotting of the force-time-relationship, corresponding to the course of the force pulses acting upon the capacitor, in the form of capacitance changes as a function of time, it is possible to carry out diagnostic tests as well as therapeutic or remedial controls in the case of vehicle collisions or damage, and experiments concerning an optimum work space layout with individually accommodated work conditions and the like. Furthermore, due to the high measuring sensitivity, a large measuring range of several $g/cm^2$ to 70 $kg/cm^2$ and a relatively low measuring error of a few percent, it is possible to already differentiate between slight changes in the intensity of a number of force components.

The deformation surface of the capacitor which is small in relation to the total capacitor surface and corresponding to about twice to about three times the force contact surface, owing to the correspondingly low electrode mass brings about a dexterous recovery of the deformed region to the null point position, so that even during the course of time there clearly appear rapidly changing force components and there can be precisely analysed a movement course, in that the capacitance change, corresponding to the deformation of the capacitor, can be detected and plotted in the form of a force-time relationship characteristic of the movement course.

The partial deformation of the capacitor with the thus resulting advantages renders the inventive measuring technique independent of the size of the measuring surface. Consequently, there are eliminated all limitations of a temporal, spatial and physiological nature which could impair the measurement result.

Hence, in accordance with the inventive method, there can be detected and analysed, for instance during athletic long jumps the entire force course from the beginning of the running start until jumping-off, if the aforementioned start takes place at a correspondingly long constructed capacitor.

A high sensitivity is of extreme importance for the evaluation of the exact course of the force, and which, according to the inventive method, can be realized by virtue of the lesser deformation resistance of the elastomeric dielectric which results from the partial deformation.

BRIEF DESCRIPTON OF THE DRAWINGS

The invention will be better understood and objects other than those set forth above, will become apparent when consideration is given to the following detailed description thereof. Such description makes reference to the annexed drawings wherein generally throughout the various Figures the same reference characters have been employed for the same components, and wherein.

Figure 16:
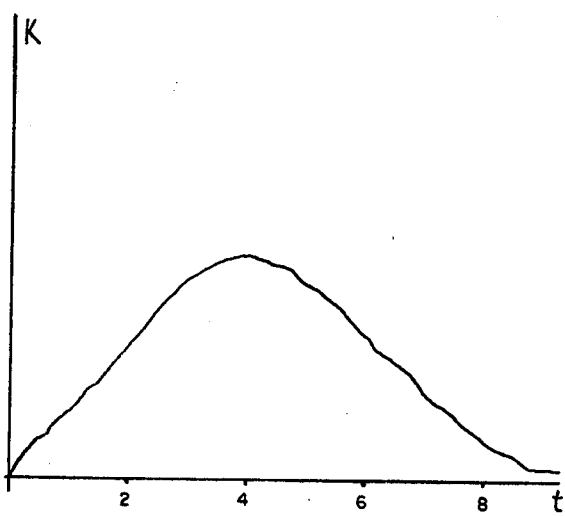
Figure 15:
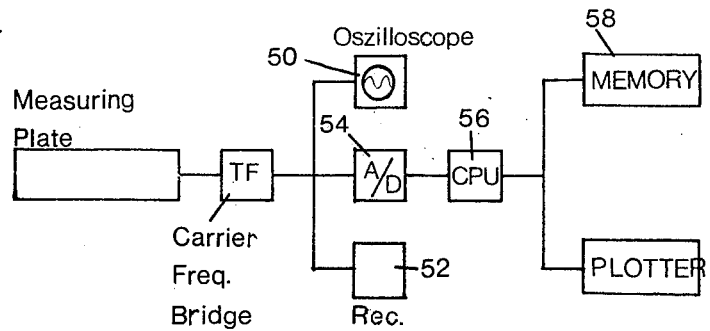
Figure 17:
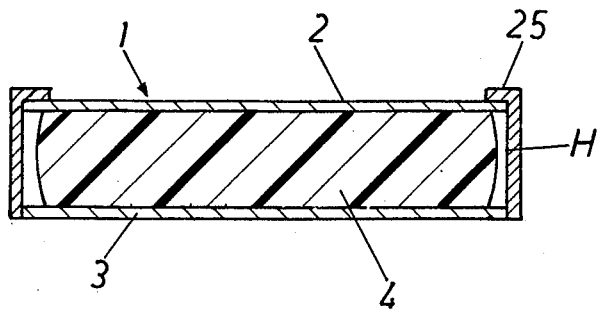
Figure 18:
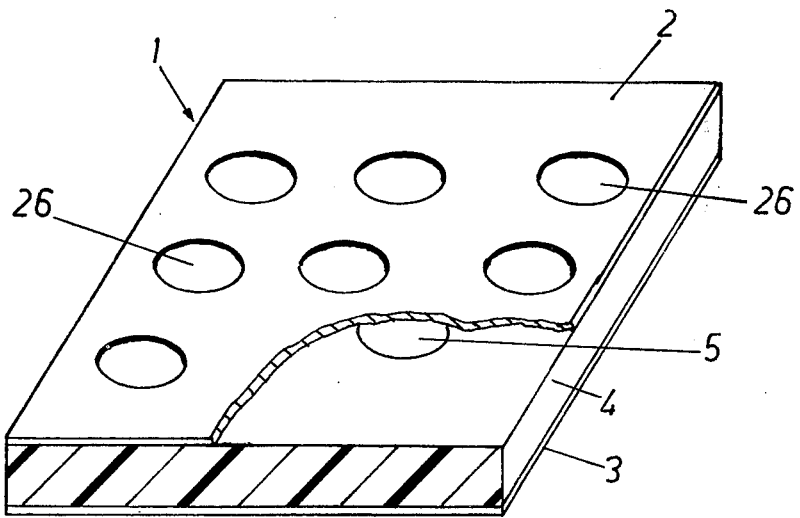

FIGS. 9–14 respectively illustrate compression deformation or strain characteristic curves or lines, sometimes referred to herein as simply compression deformation or strain characteristics;

FIG. 15 is a block circuit diagram of a preferred electronic force measuring arrangement for detecting signals analogous to the capacitance changes and employing the principles of the invention;

FIG. 16 is a curve showing the course of the force of a ball impinging upon a capacitor constructed according to the present invention;

FIG. 17 illustrates in cross-sectional view a further embodiment of capacitor; and FIG. 18 is a perspective view of still another construction of capacitor.

DETAILED DESCRIPTION OF THE PREFERRED EMBODIMENTS

Describing now the drawings, the dielectric 4 covered at its top and bottom faces by the electrodes 2 and 3, respectively, according to a preferred constructional manifestation of the invention will be seen to contain substantially cylindrical-shaped hollow spaces or voids 5. These hollow spaces 5 reduce the form factor and thus increase the compressibility of the dielectric 4. This not only increases the measuring range, but also results in a considerable linearization of the compression deformation or strain characteristic curve or line. In particular, the start of this compression strain characteristic line or characteristic can be further linearized, for instance by partially evacuating the gaseous medium located in the gas-tight closed hollow spaces 5. The resulting negative pressure preferably amounts to between about 0.3 to about 0.7 bar. By virtue of the negative pressure there is obtained a pre-compression of the dielectric 4 in the unloaded state of the electrodes 2 and 3, so that as concerns the linearity of the force-deformation relationship there are not introduced at all into the result the particularly critical starting region of the compression deformation characteristic and there can be exactly carried out a dynamic force measurement.

Figure 7:
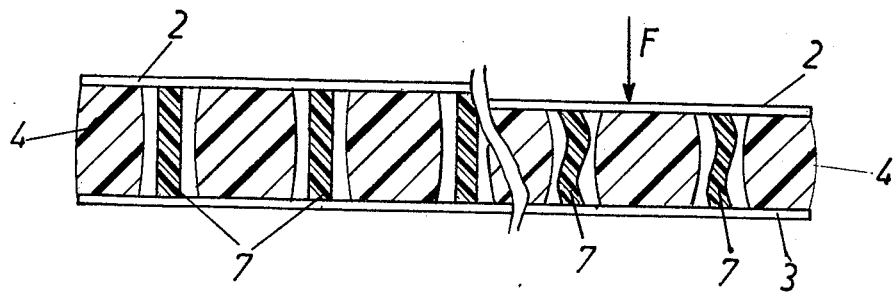
FIG. 7 is a cross-sectional view of a capacitor constructed according to the invention and employing strands for interconnecting the electrodes thereof.

A further possibility for pre-compressing the dielectric 4 in the unloaded state of the capacitor can be achieved, according to the construction of capacitor shown in FIG. 7, by connecting both of the electrodes 2 and 3 by means of electrically insulating strands 7 having an extremely high tensile strength and a low bending strength. These strands 7 in their stretched or elongated state retain both of the electrodes 2 and 3 at a spacing from one another. This electrode spacing is smaller than the thickness of the dielectric 4 in its non-compressed state by an amount corresponding to the desired pre-compression which is dependent both upon the material of the dielectric as well as also upon the desired accuracy of the measurement result at the region of relatively lesser pressures. In order to prevent falsification of the strived for exact measurement result, the resistance of the strands 7 must only be inappreciably high with respect to bending-through.

At the right-hand part of FIG. 7 there is shown in cross-section the capacitor in a compressed state by virtue of the applied force. The cross-section of the strands 7 must be smaller than the cross-section of the hollow spaces 5 to allow unhindered bending-through or buckling.

A further possibility of pre-compressing the dielectric 4 can be obtained, as shown in FIG. 17, by using an electrically non-conductive frame or housing 25 which is fixedly connected with the electrode 3, constituting a reference electrode, and the height of which is smaller than the thickness of the capacitor 1 in its unloaded state. This frame 25 engages with marginal regions or edges of the rigid electrode 2 constituting the measuring electrode.

In order to prevent falsification of the measurement result with a different high air pressure when working, for instance, with different elevational positions of the inventive capacitors, it is possible for a capacitor which is separate from the measuring surface to be integrated in such a manner into the circuit arrangement that there are automatically compensated air pressure fluctuations.

Figure 2:
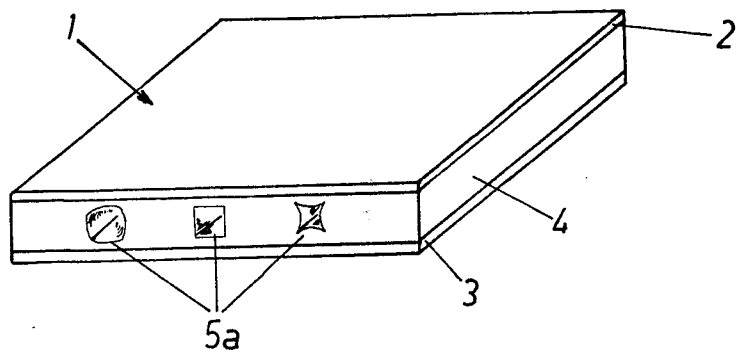
FIG. 2 is a view like FIG. 1 showing a modified construction of capacitor.
Figure 3:
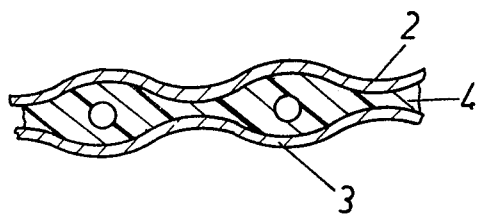
FIG. 3 is a cross-sectional view of a further construction of capacitor.

The different possibilities of configuring the cross-section of the capacitor as shown in FIGS. 2 and 3, both by changing the shape of the hollow spaces 5a extending through the dielectric 4, as shown in FIG. 2, as well as also by changing the entire cross-section of the capacitor, as shown in FIG. 3, is dependent upon both the used material as well as the field of use. The hollow spaces 5a at the left and right of FIG. 2 have a jacket surface or contour which is convexly arched or domed. Also, in FIG. 3 the electrodes 2 and 3 and dielectric 4 will be seen to have an undulating or wave-shaped configuration.

Figure 1:
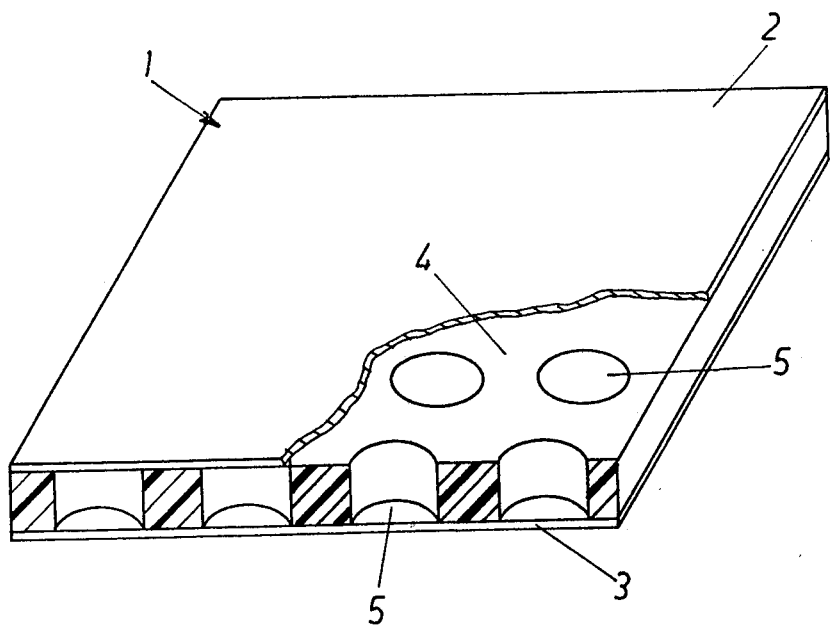
FIG. 1 illustrates in perspective view a capacitor constructed according to the teachings of the present invention.

Moreover, for instance, the arrangement of the hollow spaces 5a in a direction extending parallel to the electrodes 2 and 3, as shown in FIG. 2, advantageously can be employed for detecting maximum values, whereas orienting the hollow spaces 5 in a direction perpendicular to the electrodes 2 and 3, as shown for instance for the capacitor 1 of FIG. 1, is more suitable for observing the total force-time relationship as well as the pre-compression of the dielectric 4.

Figure 4:
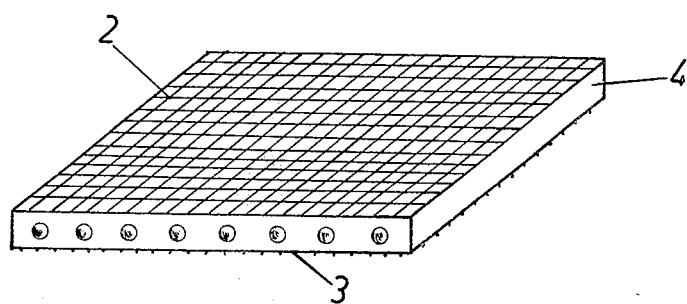
FIG. 4 is a perspective view of another embodiment of capacitor.

The grid-shaped construction of the electrodes 2 and 3, as shown in the embodiment of FIG. 4, enables obtaining a high flexibility of the capacitor with as low as possible shear forces at the region of the connection between the electrodes 2 and 3 and the dielectric 4. Additionally, due to the smaller contact surface of the electrodes 2 and 3 there is realized a reduction of the forming or molding resistance in the dielectric and thus there is obtained an increase of the sensitivity. To protect the electrodes from damage of the most varied type, the same also can be embedded in the dielectric, i.e. can be surrounded at all sides by the dielectric.

Figure 5:
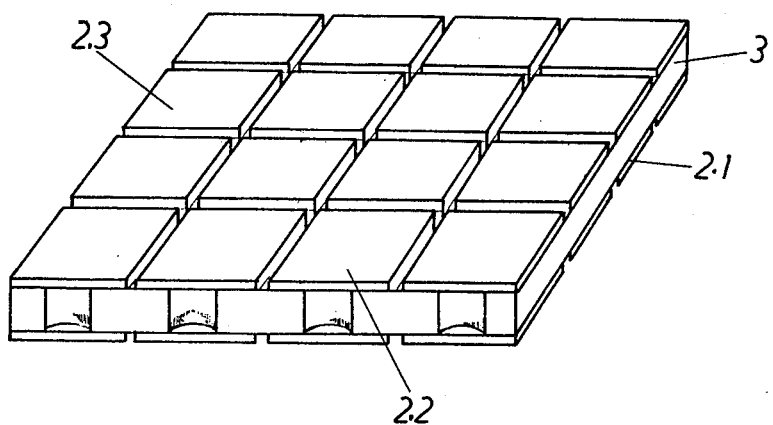
FIG. 5 illustrates in perspective view still a further construction of capacitor.

Now as shown in FIG. 5, the electrodes 2 and 3 can be subdivided into a number of smaller electrodes 2.1, 2.2, 2.3 and so forth. Due to this construction it is possible during separate detection of the individual pairs of electrodes, to exactly measure point-like forces acting upon the measuring surface, the contact locations of which cannot be exactly predetermined by means of the inventive measuring system, by appropriately overdimensioning the electrode surface, and furthermore, also can be exactly located in their position. Additionally, shear forces can be measured in accordance with the degree of the mutual displacement of the oppositly situated electrode sections or electrodes 2.1, 2.2, 2.3 and so forth.

Such type measuring arrangement could be, for instance, conceivably employed for an appropriately modified tennis racket for measuring the impact force as well as for locating the impact of the tennis ball and for possibly optimizing the impact as well as continuously monitoring the hitting of the ball.

Figure 6:
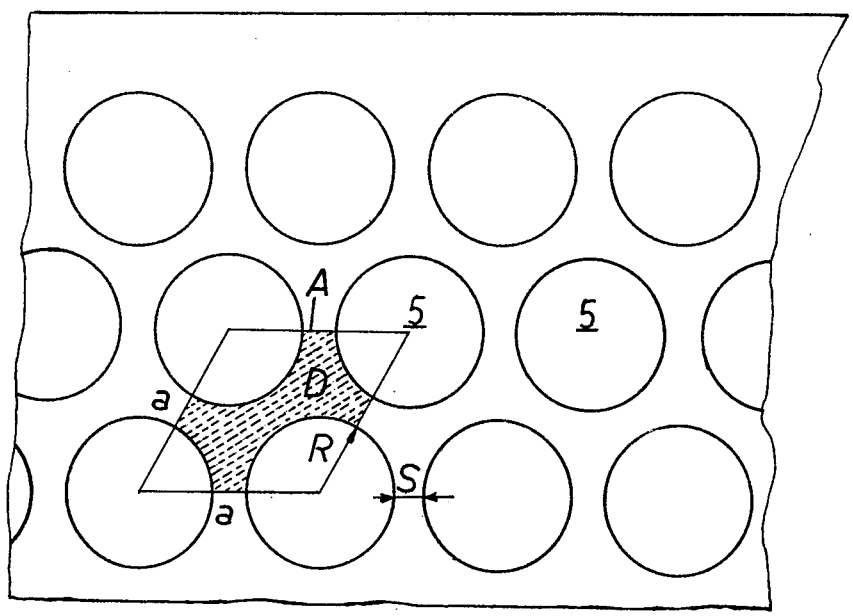
FIG. 6 is a fragmentary view showing details of a dielectric which may be used in the capacitor constructions of the invention.

Continuing, in FIG. 6 there is shown an optimim distribution of the equal size hollow spaces 5 extending in a direction perpendicular to the electrodes 2 and 3 in order to obtain a deformation resistance which is uniform throughout the entire cross-section of the dielectric 4. The spacing of the hollow spaces directly surrounding one hollow space in relation to one another as well as also in relation to the surrounded hollow space is always equal, so that the minimum web width S located between the hollow spaces 5 likewise is always constant.

The pressure surface D affording resistance against deformation—this pressure surface constituting the surface of the dielectric reduced by the area of the hollow spaces—can be calculated by the following equation:

$$D = \sqrt{\frac{3}{2}} \ (2R + S)^2 - R^2 \cdot \pi$$

This pressure surface D in relation to the outer or jacket surface—$2R\pi H$ (wherein H represents the thickness of the dielectric)—is designated as the form factor and, apart from the deformation resistance of the dielectric which is dependent upon the pressure surface D, also constitutes a measure for the measuring range which is essentially dependent upon the thickness.

Figure 8:
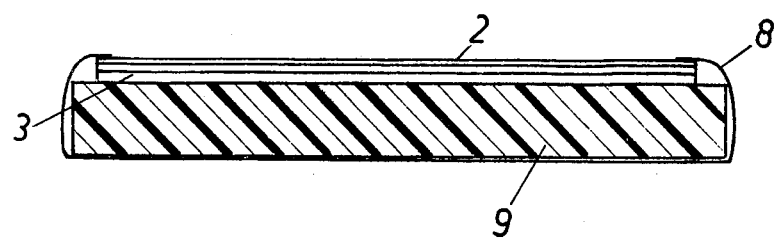
FIG. 8 illustrates in cross-sectional view another embodiment of capacitor.

The measurement of influences disturbing the capacitance change can be eliminated by constructing a Faraday cage. A preferred embodiment resides in leading a grounded metal foil 8 which is conductively connected with the upper measuring electrode 2, at which there is applied the force to be measured, around the reference electrode 3, as best seen by referring to FIG. 8. To prevent short-circuits it is necessary to provide an electrical insulation between the lower electrode 3 and the metal foil 8. Advantageously, this can be achieved by the arrangement of a support 9 beneath the lower electrode 3 and which support is utilized for reinforcement of the capacitor.

The support or substrate 9 preferably consists of grid-shaped arranged profile or structural members formed of plastic and cast in a synthetic resin. In this way there can be obtained an exceedingly small weight and a very high bending strength. The bending strength is of particular significance inasmuch as for protection of the connection of the electrodes and dielectric, which are subjected to special loads due to bending-through when a large size measuring unit is manually transported for instance, it is absolutely necessary to avoid shear stresses in the direction of the electrodes 2 and 3.

A further possibility of obtaining a particularly bending resistant plate for this purpose would be to form the same, for instance, as a glass fiber reinforced polyester plate.

In FIGS. 9-13 there are illustrated compression strain characteristic curves or characteristics of sample bodies e.g. constituting dielectrics for the capacitors and formed of the same natural rubber mixture. These compression strain characteristics differ appreciably from one another by virtue of the most different effects, such as form factor, adhesive bond or the like.

The curves shown along the abscissa the deformation in percent related to the original thickness of the sample body, and along the ordinate there is plotted the magnitude of the applied pressure in deca-Newton/cm$^2$.

Figure 9:
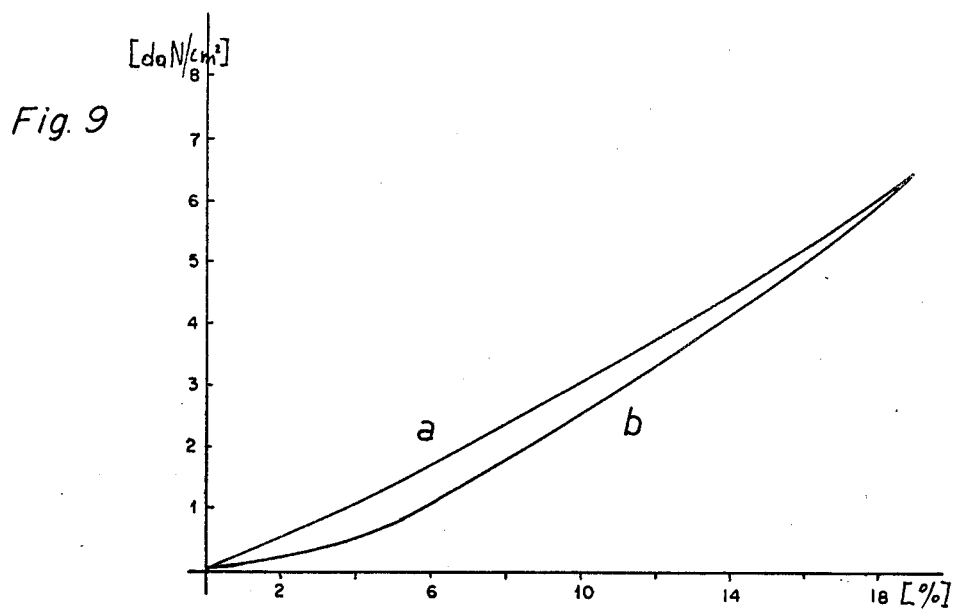
Figure 10:
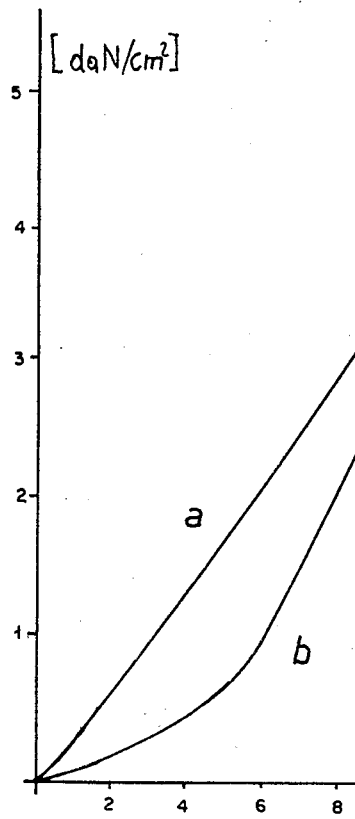
Figure 11:
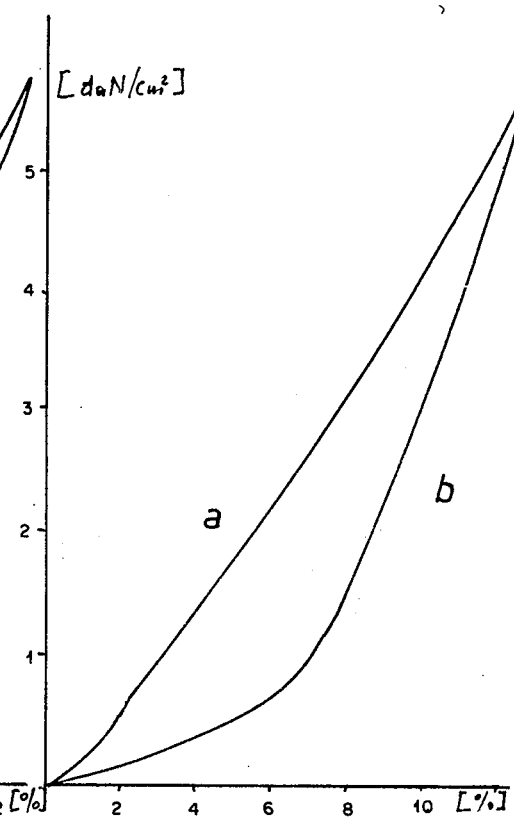

The samples from which there have been plotted the compression strain characteristic lines shown in FIGS. 9-11 are each 10 mm thick, clamped between two electrode plates which, however, are not adhesively bonded with the sample body constituting the dielectric, and do not have any hollow spaces. The difference is predicatable upon the form factor which is dependent upon the ratio of the pressure or compression surface to the surface of the sample body which is perpendicular thereto, the form factor in FIG. 9 amounting to 0.5, and in the further Figures to 0.75 and 1.0.

Each graph will be seen to consist of two lines, of which the one line designated by reference character a denotes the course of the compression strain during deformation, whereas the line b designates the aforementioned course during the recovery of the sample body. The difference of both integrated surfaces is considered as the hysteresis loss or also as the dampening.

The characteristic curves basically show the problem of non-linearity, especially at the starting region and the thus resulting non-proportionality of the relationship of the force to the momentarily arising capacitance change. This non-proportionality is extremely disadvantageous for an exact measurement result and especially for the determination of the total force-time course for comparative observations in the field of biomechanics. Of even greater disadvantage as to its effect is the significantly higher deviation of the deformation recovery line b from the linearity and particularly from the deformation line a.

The reason for this non-linear course of the compression strain characteristic curve and the hysteresis reside in the structure of the rubber and elastomer composed of chain molecules which are interlinked with one another, and therefore, cannot be eliminated from this standpoint. In accordance with the objective of the invention it was attempted to influence the transverse elongation possibility extending perpendicular to the deformation direction in such a manner that there was obtained as extensive as possible linearization both of the deformation curve as well as also the recovery curve. This was accomplished by changing the form factor, by imparting the most different shapes to the hollow spaces piercingly extending through the dielectric, by partially evacuating the air out of the gas-tight sealed hollow spaces and the like.

As the characteristics or characteristic curves of FIGS. 9-11 clearly show, the linearity has been appreciably improved merely be reducing the form factor, i.e., either with constant thickness of the dielectric by reducing the pressure surface or with constant pressure surface by increasing the thickness, or by a sensible combination of both of these features.

Figure 12:
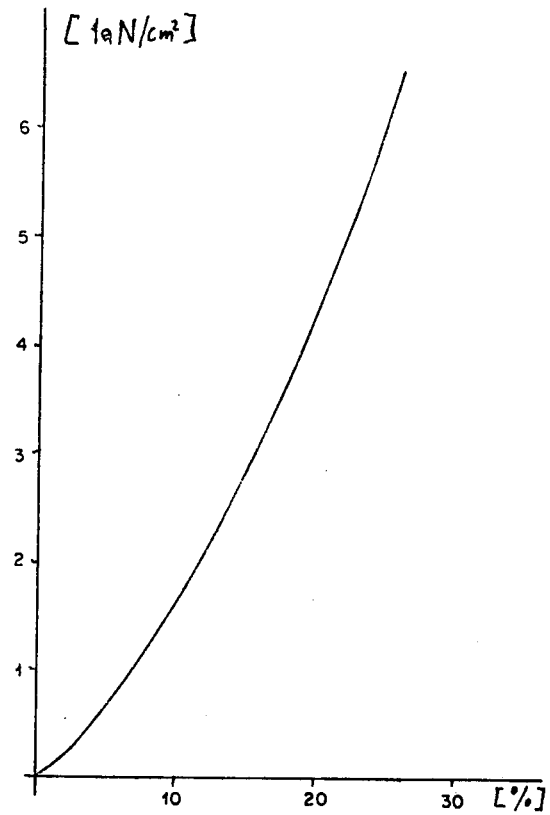
Figure 13:
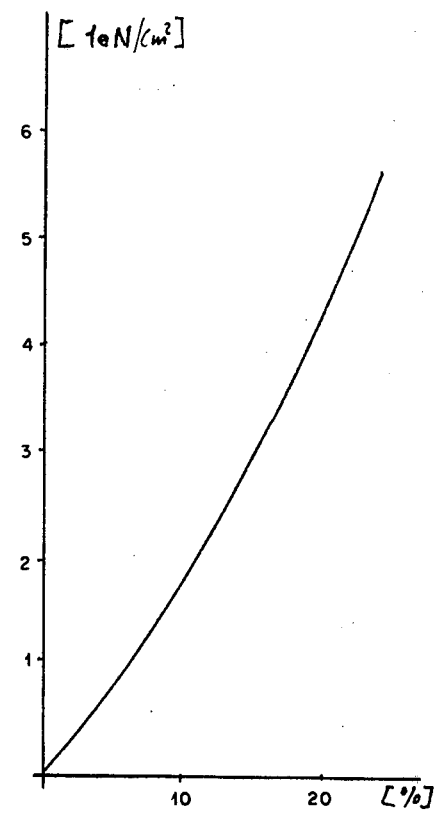

The compression strain curves of FIGS. 12 and 13 already almost approximate linear curves, and the same can be particularly realized by perforating the sample body, i.e., the dielectric. Further, optimumization, especially at the starting region, can be expected by adhesively bonding the dielectric with the electrode (FIG. 13).

Figure 14:
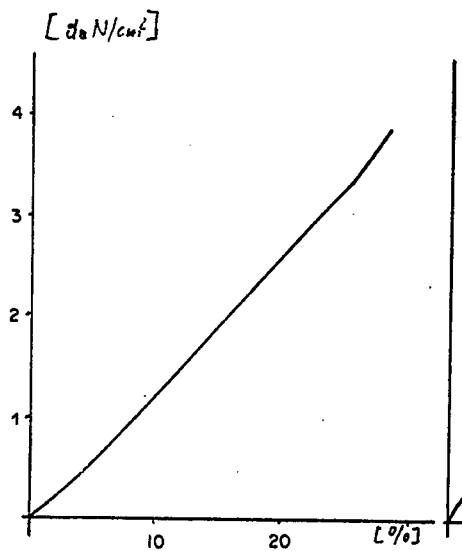

A further optimumization can be realized by partially evacuating the gas in the hollow spaces, so that there is formed a negative pressure of about 0.5 bar (FIG. 14).

A preferred and optimum measuring arrangement for detecting, plotting and storing the analog signals derived from the capacitance change has been illustrated in FIG. 15 by way of example.

The capacitance change dependent upon the force which is to be detected and acting upon the measuring electrode 2, in turn produces an untuned state at the carrier frequency bridge TF. The output signal can be either immediately recorded at the oscilloscope 50 and-/or at the recorder 52. A further possibility, especially of importance in the field of biomechanics, resides in storing in the memory 58 the digital signals converted in the analog-digital converter 54. In this way there is possible an elongation and thus an exact evaluation of the force-time curve. The microprocessor 56 is used as a control and can appropriately modify the measurement result depending upon the most different field of application of the capacitor.

Now in FIG. 16 there is plotted the force as a function of time upon impact of an approximately 0.5 kg heavy ball against a capacitor constructed according to the teachings of the invention. The impact velocity of the ball amounted to 44.8 km/h, the duration of the impact at the capacitor amounted to about 8 milliseconds. Of particular significance is the symmetric course of the curve, essentially obtained by eliminating the non-linear starting region of the load characteristic curve as well as by linearization of the unloading or recovery characteristic curve. What is particularly worthy of mention is also the extremely short recovery time of about 4 milliseconds, following which there is almost completely eliminated the prior deformation. This brief recovery time is particularly attainable by virtue of the afore-described pre-compression and the afore-mentioned membrane effect.

An advantage of biomechanics which is particularly appreciated by athletes resides in the training possibilities for a movement course which is recognized to be optimum and which can be learned by continually observing the force-time relationship at the oscilloscope 50.

Other fields of use of the invention are of course, for instance, in the field of ergonomics for improving conditions at the work site, the optimumization of shapes or forms causing flow conditions, monitoring the state of structures, especially bridges, measuring axle loads or the like.

Finally, the modified version of capacitor 1, shown in FIG. 18, has at least one of the electrodes, here the electrode 2, provided with holes 26 at the region of the dielectric material between the hollow spaces 5.

In the context of this disclosure it is here further mentioned that the term "elastomeric", where appropriate, is used in its broader sense to encompass both rubber and synthetic materials, such as plastics.

While there are shown and described present preferred embodiments of the invention, it is to be distinctly understood that the invention is not limited thereto, but may be otherwise variously embodied and practiced within the scope of the following claims.

ACCORDINGLY,

What we claim is:

1. A capacitor comprising:
   a pair of separate electrodes, one of which electrodes defines a measuring electrode;
   an elastic dielectric interposed between said pair of electrodes and having a plurality of air containing chambers, for separating said electrodes from one another;
   said elastic dielectric being formed from a material selected from the group consisting of rubber, plastic and mixtures, thereof;
   said electrodes serving for the measurment of forces acting upon said measuring electrode by detecting resultant capacitance changes; and
   said plurality of air containing chambers having an air pressure that is less than normal atmospheric air pressure.

2. The capacitor as defined in claim 1, wherein said air pressure is within the range of about 0.9 bar and 0.3 bar.

3. The capacitor as defined in claim 2, wherein:
   said dielectric material located between said chambers and said electrode surfaces facing said chambers are basically free of very volatile components.

4. The capacitor as defined in claim 3, wherein:
   said dielectric material located between said chambers is connected with said electrodes by an adhesive; and said adhesive is free of very volatile components.

5. The capacitor as defined in claim 3 wherein:
   said dielectric material located between said hollow chambers is connected to said electrodes by a foil having adhesive on both sides thereof.

6. The capacitor as defined in claim 3, wherein:
   said dielectric material located between said chambers is connected to said electrodes by vulcanization.

7. The capacitor as defined in claim 1, wherein:
   the ratio of the surface of said dielectric material in contact with said electrodes to the outer surface of said hollow chambers, has a forming factor in the range of about 0.2 to 0.7.

8. The capacitor as defined in claim 4, wherein:
   the dielectric material between neighboring chambers defines cross bars, wherein the smallest cross bar width between two chambers is approximately equal to the height of said cross bar.

9. The capacitor as defined in claim 1, wherein said dielectric material located between said hollow chambers has a cellular structure.

10. The capacitor as defined in claim 2, wherein said chambers are cylindrical in shape having an outer surface curved in a convex manner.

11. The capacitor as defined in claim 1, wherein said dielectric material located between said plurality of chambers has a resilient elasticity of greater than 70%, as measured in accordance with German Industrial Standard 53.512.

12. The capacitor as defined in claim 1, wherein said dielectric material located between said chambers has a residual compression strain of less than 5%, as measured in accordance with German Industrial Standard 53.517.

13. The capacitor as defined in claim 1, wherein:
    said measuring electrode is formed of highly elastic steel having an elastic limit exceeding about 900 Newton/mm$^2$ and a thickness in the range of about 0.1 to about 0.8 millimeters.

14. The capacitor as defined in claim 13, wherein: said thickness of the measuring electrode is in a range of about 0.3 to about 0.7 millimeters.

15. The capacitor as defined in claim 13, wherein:
    at least one of said electrodes possesses a substantially grid-shaped configuration.

16. The capacitor as defined in claim 1, wherein:
    said two electrodes and said dielectric are structured so as to impart a substantially wave-shaped cross-sectional configuration to the capacitor.

17. The capacitor as defined in claim 13, wherein: at least one of the electrodes contains profiled portions protruding into said dielectric.

18. The capacitor as defined in claim 1, wherein at least one of said electrodes consists of one material from a group of electrically conductive rubber and plastic.

19. The capacitor as defined in claim 1, wherein:
    at least one of said electrodes is provided with holes at the region of the material of the dielectric located between the chambers.

20. The capacitor as defined in claim 1, wherein:
    the other of said electrodes defines a reference electrode;
    electrical screening means spaced from said reference electrode an amount equal to at least five times the size of the thickness of the capacitor.

21. The capacitor as defined in claim 20, wherein: the spacing of said electrical screening means from said reference electrode amounts to at least ten times the size of the thickness of the capacitor.

22. The capacitor as defined in claim 20, further including:
    a grounded metal foil surrounding said reference electrode and electrically conductively connected with said measuring electrode.

23. The capacitor as defined in claim 1, wherein said chambers are separated from each other in an airtight fashion.

24. The capacitor as defined in claim 1, especially for measuring and locating forces of a relatively large measuring surface and which forces act upon a relatively small surface, wherein:
    at least one of said electrodes is subdivided into a number of mutually independent electrode plates.

* * * * *